United States Patent
Tan

(10) Patent No.: US 10,773,351 B2
(45) Date of Patent: Sep. 15, 2020

(54) SUBSTRATE CLAMPING DEVICE

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Wei Tan, Guangdong (CN)

(73) Assignee: SHENZHEN CHINA STAR OPTOELECTRONICS SEMICONDUCTOR DISPLAY TECHNOLOGY CO., LTD., Shenzhen, Guangdong (CN)

(*) Notice: Subject to any disclaimer, the term of this patent is extended or adjusted under 35 U.S.C. 154(b) by 249 days.

(21) Appl. No.: 16/024,013

(22) Filed: Jun. 29, 2018

(65) Prior Publication Data

US 2019/0152009 A1 May 23, 2019

Related U.S. Application Data

(63) Continuation of application No. PCT/CN2018/075453, filed on Feb. 6, 2018.

(30) Foreign Application Priority Data

Nov. 20, 2017 (CN) .......................... 2017 1 1155901

(51) Int. Cl.
| | |
|---|---|
| B25B 1/20 | (2006.01) |
| B23Q 15/007 | (2006.01) |
| B25B 5/14 | (2006.01) |
| B25B 5/00 | (2006.01) |
| B25B 5/06 | (2006.01) |
| B25B 5/10 | (2006.01) |

(52) U.S. Cl.
CPC .......... *B23Q 15/0075* (2013.01); *B25B 5/003* (2013.01); *B25B 5/067* (2013.01); *B25B 5/106* (2013.01); *B25B 5/145* (2013.01)

(58) Field of Classification Search
CPC ............ B25B 11/00; B25B 11/02; B25B 1/00
See application file for complete search history.

(56) References Cited

U.S. PATENT DOCUMENTS

| | | | | |
|---|---|---|---|---|
| 3,591,303 A * | 7/1971 | Conway | ................... | B23B 47/28 408/108 |
| 5,725,205 A * | 3/1998 | O'Berg | ..................... | B25H 1/00 269/37 |
| 5,906,539 A * | 5/1999 | Tabel | ....................... | B25H 1/02 248/188.2 |
| 6,009,617 A * | 1/2000 | Fan | ......................... | H01H 13/70 200/517 |
| 2019/0152009 A1* | 5/2019 | Tan | ........................... | B25B 5/06 |

* cited by examiner

*Primary Examiner* — Lee D Wilson
(74) *Attorney, Agent, or Firm* — Leong C. Lei

(57) ABSTRACT

The present invention relates to a display manufacturing field. Disclosed is a substrate clamping device. The substrate is arranged on the trolley. The clamping arms arranged on the trolley are used for fixing the substrate. The clamping arms move up and down as rotating by means of the rotary lifting mechanism, thereby clamping and releasing the substrate. The impact on the substrate is small in the entire clamping process, and the handling of the substrate is facilitated. The clamping arms arranged around the substrate and symmetrically arranged in pair can keep the force of the substrate uniformly and can clamp the substrate more reliably.

10 Claims, 3 Drawing Sheets

SUBSTRATE CLAMPING DEVICE

CROSS-REFERENCE TO RELATED APPLICATION

This application is a continuation application of PCT Patent Application No. PCT/CN2018/075453 filed Feb. 6, 2018, which claims the priority of Chinese Patent Application No. 201711155901.8, entitled "Substrate clamping device", filed on Nov. 20, 2017. The disclosure of which is incorporated herein by reference in its entirety.

FIELD OF THE INVENTION

The present invention relates to a display manufacturing field, and more particular to a clamping device for a substrate on a sputtering machine.

BACKGROUND OF THE INVENTION

Sputtering machines are widely used in the coating process of display panels, such as OLED cathode coating or TP vanishing layer. Many coating processes do not require to form the film on the entire substrate but merely to deposit the film of the specific shape at the specific position. This requires the substrate to be tightly aligned with the metal mask when the substrate is coated and the relative position of the substrate and the metal mask to needs to be maintained after the alignment is completed, which cannot be changed at all during the entire film formation process. Therefore, the substrate clamping device is particularly important in the entire sputtering machine.

The current sputter substrate jig is generally mounted on the long side of the substrate. After the alignment is completed, the substrate is declined to the film deposition position. The substrate is clamped by using two or four jigs on the long side. Such jig design has the following defects: only fixtures on the two long sides do not guarantee that the short sides do not move during the film formation process; the clamping and loosening of such fixtures require the motor driving at both sides, however, the number of fixtures cannot be more with the restriction of the limited space of the coating chamber; the metal mask mounted on the fixtures has to be disassembled and verified every time for replacing the metal mask model, which will waste time and affect production capacity; frequently disassembled components are easily damaged to increase costs; it is easy to cause warpage of the substrate and/or the metal mask caused by the uneven stress of the substrate to cause the shadow of the coating, which affects the film formation quality.

There are also some sputter machines that choose not to install fixtures but only utilize the gravity of the substrate itself and improve the vibration of the actuator to maintain the relative position of the substrate and the metal mask. However, in case that the fixture is not used, once the transmission mechanism of the device vibrates, it will cause a change in the relative position.

SUMMARY OF THE INVENTION

An objective of the present invention is to provide a substrate clamping device capable of reliably clamping and not requiring frequent replacement, and specifically is:

a substrate clamping device for fixing a substrate on a trolley of a sputtering machine, wherein the substrate clamping device comprises clamping arms, a tray and a lifting driving device connected to a bottom of the tray, the lifting driving device drives the tray to move up and down relative to the trolley; the clamping arms are provided on the trolley and are enclosed to form an accommodating space, the accommodating space is used to accommodate the substrate, the clamping arm comprises a bracket and a clamping jaw, the bracket is connected to the trolley by a rotary lifting mechanism to drive the clamping jaw to perform rotation and lifting movements simultaneously; the clamping jaws are in contact with an upper surface of the substrate after rotation and declining movements to clamp to be placed on the substrate; the tray is located below the trolley, the tray is provided with first pushing rods and second pushing rods; the first pushing rods cooperate with the clamping arms to push the clamping arms upward; the second pushing rods push the substrate upward.

The rotary lifting mechanism is a ball screw, the bracket is provided with a thread groove matched with the ball screw.

As the clamping arm is rotated by the first pushing rod, a maximum rotation angle of the clamping arm is 90 degrees.

A spring is disposed between the clamping arm and the trolley to provide a downward direction elastic force for the clamping arm.

There is a plurality of clamping arms, a number of the first pushing rods is equal to a number of the clamping arms and corresponds to each other one by one, and the plurality of clamping arms are lifted or declined at the same time with a same speed.

The clamping arms are symmetrically arranged on both sides of the substrate.

Two of the clamping arms, which are symmetrically arranged, have a same rotating direction as being lifted or declined.

The accommodating space enclosed by the clamping arms is a rectangle, at least one pair of the clamping arms is correspondingly arranged on a long side and a short side of the rectangle for clamping four edges of the substrate.

The plurality of the clamping jaws is in contact with or disengaged from the substrate at the same time.

A contact surface of the clamping jaw with the substrate is processed to be an arc so as not to scratch the substrate.

In the substrate clamping device of the present invention, the substrate is arranged on the trolley. The clamping arms arranged on the trolley are used for fixing the substrate. The clamping arms move up and down as rotating by means of the rotary lifting mechanism, thereby clamping and releasing the substrate. By controlling the lifting and declining of the rotary lifting mechanism, the lifting and declining strokes of the clamping arms can be controlled to control the impact of the clamping arms to the substrate. The rotating action can allow the clamping jaws to cover or leave the upper surface of the substrate to facilitate the picking action of the substrate.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
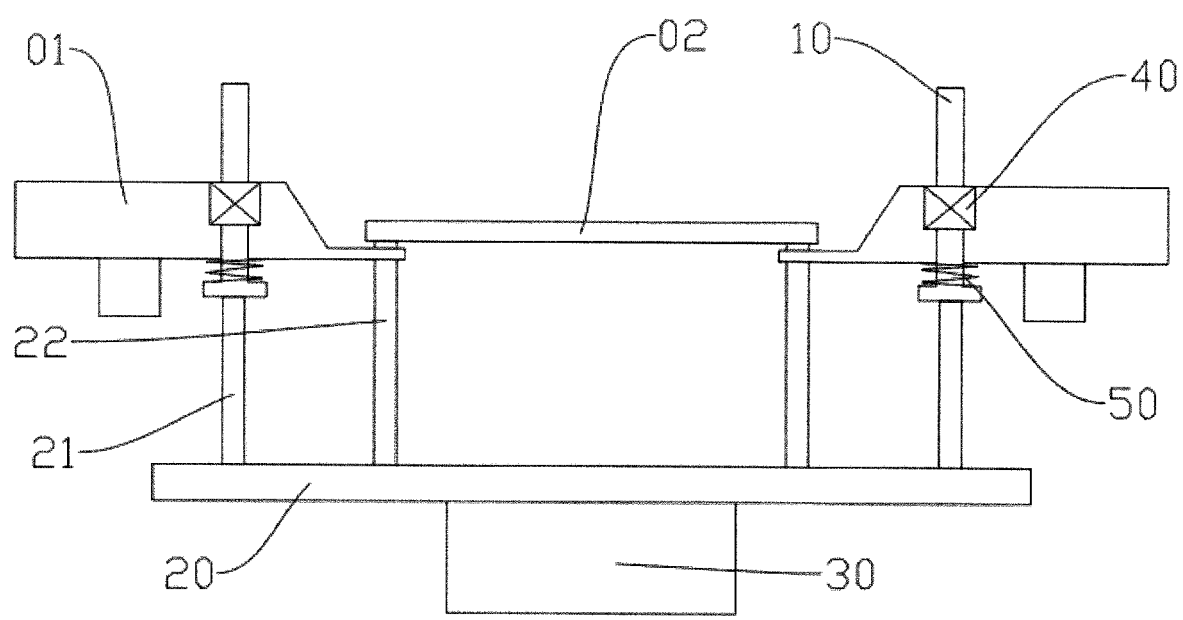
FIG. 1 is a diagram of a substrate clamping device at the highest position according to the present invention.

Please refer to the substrate clamping device 100 in FIG. 1 that the entire device is disposed inside a sputtering machine. The substrate clamping device comprises clamping arms 10, a tray 20 and a lifting driving device 30 connected to a bottom of the tray. The clamping arms 10 are provided on the trolley 01 of the sputtering machine and are enclosed to form an accommodating space, the accommodating space is used to accommodate the substrate 02 on the trolley 01 of the sputtering machine, and the clamping arms 10 are arranged at outer edge of the substrate 02 for fixing the substrate 02. The clamping arm 10 comprises a bracket 11 and a clamping jaw 12. A portion of arm contacting with the surface of the substrate 02 and clamping the substrate 02 is the clamping jaw 12. The bracket 11 is connected to a rotary lifting mechanism 40. The rotary lifting mechanism 40 is fixed on the trolley 01. The bracket 11 is movably connected on the trolley 01 by the rotary lifting mechanism 40 to drive the entire clamping arm 10 to perform rotation and lifting movements simultaneously relative to the trolley 01 with the function of the rotary lifting mechanism 40.

The tray 20 is located below the trolley 01, the tray 20 is provided with first pushing rods 21 and second pushing rods 22. The lifting driving device 30 drives the tray 20 to move up and down. All the first pushing rods 21 and the second pushing rods 22 are moved up and down with the tray 20. The first pushing rods 21 cooperate with the clamping arms 10 to push the clamping arms 10 upward. The second pushing rods 22 push the substrate 02 upward.

As the substrate clamping device 100 of the present invention works, the tray 20 needs to be lifted to the highest position first, and the substrate 02 is placed on the tray 20, specifically, is placed on the second pushing rods 22. After the substrate 02 is aligned on the trolley 01 with the marks of the substrate, the tray 20 is moved downwardly by the lifting driving device 30. The substrate 02 is declined due to the force of gravity. Finally, the substrate 02 is held on the trolley 01. Namely, the substrate 02 reaches a film formation position. After the tray 20 reaches the bottommost position, the second pushing rods 22 are disengaged from the substrate 02. In the entire process, the tray 20 has to be declined smoothly and slowly to ensure the smooth contact between the second pushing rods 22 and the substrate 02. Finally, the accuracy of the position of the substrate 02 on the trolley 01 can be ensured. Certainly, for ensuring the alignment accuracy of the substrate 02, more fine-tuning and checking operations can be applied as the substrate 02 lands on the trolley 01.

Figure 2:
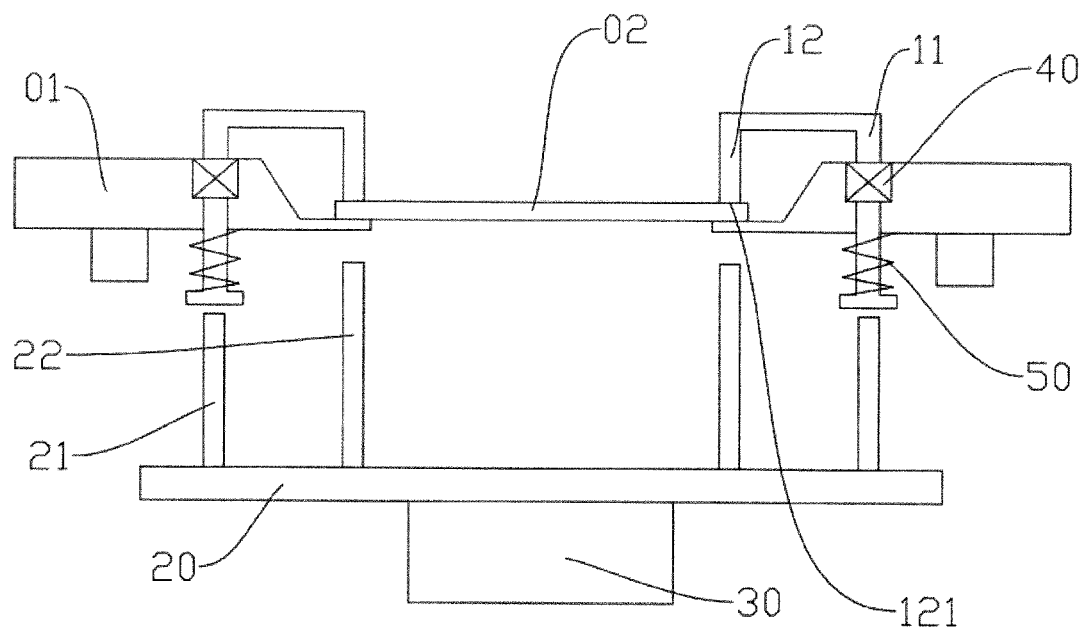
FIG. 2 is a diagram of a substrate clamping device at the lowest position according to the present invention.
Figure 3:
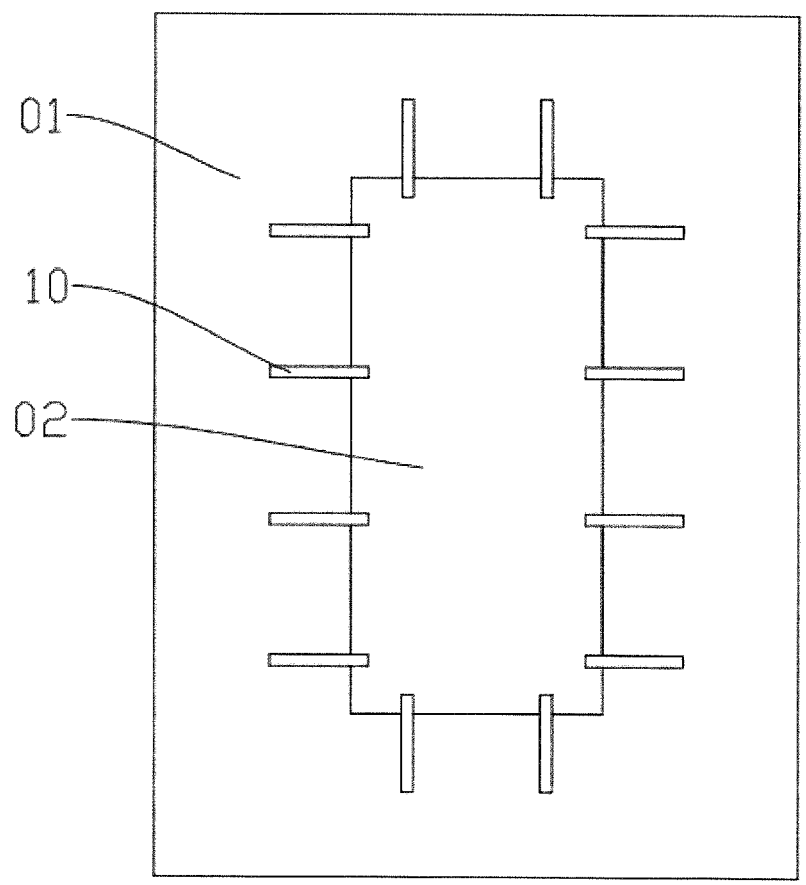
FIG. 3 is a top view diagram of a substrate clamping device at the lowest position according to the present invention.

Since the first pushing rods 21 also move up and down synchronously with the tray 20, the first pushing rods 21 are also declined from the highest position to the lowest position in the process of the tray 20 declining from the highest point to the lowest point. Then, the brackets 11 cooperating with the first pushing rods 21 are also declined with the brackets 11 with the force of gravity. Then, the rotary lifting mechanism 40 cooperates with the brackets 11 so that the brackets 11 simultaneously rotate during the declining process. The entire clamping arm 10 is also rotated with the bracket 11 as an axis and is declined simultaneously until the clamping jaw 12 is rotated to the position above the substrate 02. After in contact with the upper surface of the substrate 02, the entire clamping arm 10 reaches the lowest position (shown in FIG. 2). At this time, the gravity of the entire clamping arm 10 is transmitted to the upper surface via the clamping jaw 12, and the substrate 02 cannot move vertically due to the gravity of the clamping arm 10. Meanwhile, due to the self-weight and the action of the clamping arm 10, a friction force is generated with the trolley 01 and the clamping jaw 12 at the contact position, the horizontal movement of the substrate cannot occur. The substrate clamping device 100 of the present invention allows the substrate 02 to be completely fixed to the trolley 01 (shown in FIG. 3).

Figure 4:
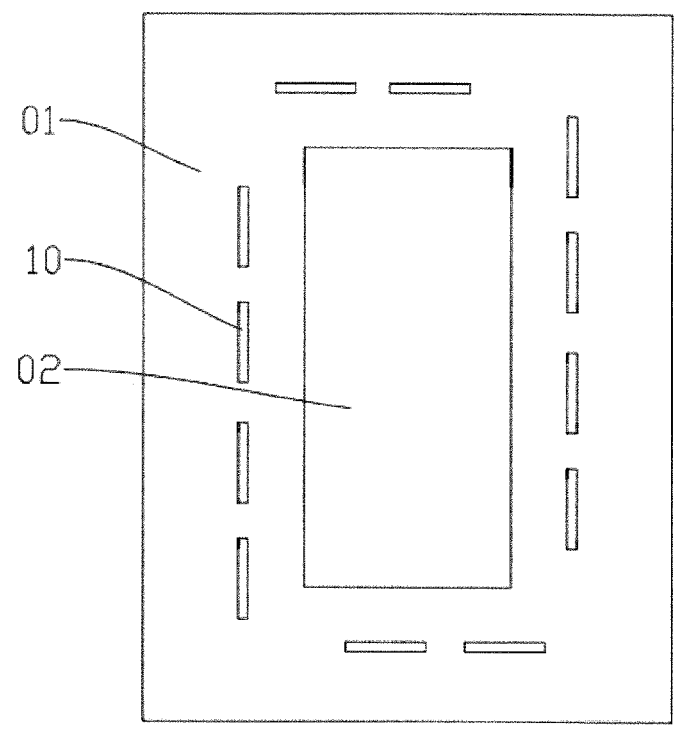
FIG. 4 is a top view diagram of a substrate clamping device at the highest position according to the present invention.

Specifically, for not influencing the placement and declining operation of the substrate 02, the clamping arms 10 need to be completely withdrawn from the upper space of the substrate 02 (see FIG. 4) at the highest position and to avoid the collision with the substrate 02 during the declining and rotating process thereafter. This can be achieved by adjusting the cooperation of the rotary lifting mechanism 40 with the brackets 11.

Besides, after the clamping jaws 12 are in contact with the upper surface, the first pushing rod 21 and the bracket 11 should continue to move relative to each other to break the detachment and support relationship. Or, at least, the first pushing rod 21 is in contact with the bracket 11 without an interaction force. Thus, it can be ensured that the weight of the clamping arm 10 acts on the upper surface to achieve the clamping function of the clamping arm 10 to the substrate 02.

Certainly, the contact of the clamping jaws 12 with the upper surface should happen after the substrate 02 is declined to the lowest point, i.e. in contact with the trolley 01 to reach the film formation position. Before the clamping jaws 12 are in contact with the upper surface, the lifting driving device 30 can stop declining halfway. After the fine-tuning and checking operations for the substrate 02 and the alignment are accomplished, the tray 20 is declined to the lowest position to complete the clamping operation of the clamping arms 10 to the substrate 02.

After the substrate 02 completes the coating process in the sputtering machine, the tray 20 is moved upward from the lowest position by the lifting driving device 30. As reverse of the declining and clamping, the first pushing rod 21 is first in contact with the bracket 11 so that the clamping arm 10 starts to be rotated and lifted. The clamping jaw 12 is lifted off from the upper surface and is rotated away from the upper space of the substrate 02 to release the rising path of the substrate 02 to avoid the collision. Then, the second pushing rod 22 comes into contact with the substrate 02 and drives the substrate 02 up to the highest point so that the substrate 02 can be withdrawn. Specifically, the process that the second pushing rod 22 is in contact with the substrate 02 and rises does not need to occur after the clamping arm 10 completely reaches the highest position. As long as the distance between the first pushing rod 21 and the second pushing rod 22 is adjusted and the cooperation between the rotary lifting mechanism 40 and the bracket 11 are adjusted to ensure that the substrate 02 will not collide and contact with the clamping arm 10 in the lifting process, the effect of the present invention can be achieved.

According to the substrate clamping device 100 of the present invention, the clamping arm 10 is disposed on the trolley 01 to prevent the fixed installation of the clamping device and the metal mask. The redundant operations of replacing and aligning the metal mask for every time can be eliminated. The clamping arm 10 realizes the action of moving up and down as being rotated by the rotary lifting mechanism 40 to clamp and release the substrate 02. The rising angle of the rotary lifting mechanism 40 can be controlled to control the lifting stroke of the clamping arm 10 so as to avoid excessive impact of the clamping arm 10 on the substrate 02. The rotating action can allow the clamping jaws 12 to cover or leave the upper surface of the substrate 02 to facilitate the placing and picking actions of the substrate 02.

Figure 5:
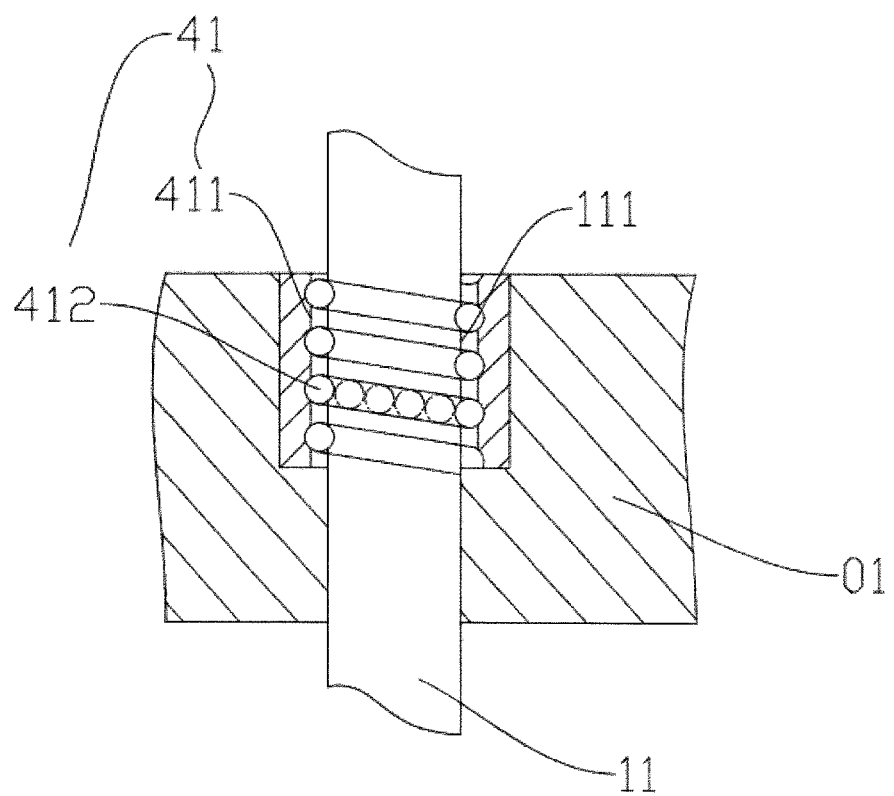
FIG. 5 is a diagram of a rotary lifting mechanism of a substrate clamping device according to the present invention.

In one embodiment, the rotary lifting mechanism 40 is a ball screw 41 as shown in FIG. 5. The ball screw 41 includes an inner thread groove 411. The bracket 11 is provided with a thread groove 111 matched with the inner thread groove 411 of the ball screw 41. The balls 412 are also arranged between the female thread groove 411 and the thread groove 111. When the bracket 11 axially moves relative to the ball screw 41, the inner thread groove 411 and the thread groove 111, which cooperate with each other, generate relative rotational motion under the action of the balls 412. Because the ball screw 41 is fixed on the trolley 01 and cannot be rotated, the bracket 11 is rotated. Moreover, with the rolling motion of the balls 412, the friction force between the bracket 11 and the ball screw 41 can be made smaller, the movement is smoother, and there is no jamming, which ensures a good clamping effect.

In one embodiment, as the clamping arm 10 is rotated by the first pushing rod 21, a maximum rotation angle of the clamping arm is 90 degrees. Namely, the clamp arm 10 is rotated only 90 degrees between the highest position and the lowest position. The entire rotation angle needs to be achieved by the cooperation between the rotary lifting mechanism 40 and the bracket 11. For the ball screw 41, it is necessary to adjust the thread rising angle of the inner thread groove 411 and to correspondingly adjust the thread rising angle of the thread groove 111 on the bracket 11.

When the clamping arm 10 is rotated by 90 degrees, the clamping arm 10 may be set to be parallel to the side of the substrate 02 at the highest position, so as to prevent the collision of the clamping arm 10 and the substrate 02 as possible. When the clamping arm 10 is at the lowest position, it is perpendicular to the side of the substrate 02 to clamp the same, which facilitates the control of the clamped portion.

In one embodiment, for avoiding the insufficient self-gravity of the clamping arm 10 or the unsmooth motion and jam of the bracket 11 and the rotary lifting mechanism 40 due to the improper weight. A spring 50 may be disposed between the damping arm 10 and the trolley 01. The spring 50 can be a compression spring. On end if arranged under the trolley 01 and the brackets 11 provides an upward end surface for fixing the other end of the spring 50 to provide a downward direction elastic force for the clamping arm 10. The spring 50 can also be a tension spring. One end is disposed above the trolley 01 and the bracket 11 provides a downward end surface for fixing the other end of the spring 50.

In order to clamp the substrate 02 more smoothly, in some embodiments, there is a plurality of clamping arms 10 and there is a plurality of first pushing rods 21. Meanwhile, the amount of the first pushing rods 21 is equal to the amount of the clamping arms 10 top form a plurality of sets of one-to-one corresponding first pushing rod 21 and clamping arm 10. In the operating process of the substrate clamping device 100 according to the present invention, the plurality of first pushing rods and the plurality of clamping arms 10 are lifted at the same. The plurality of clamping arms 10 are declined at the same time. The speed for lifting and the speed for declining are the same to ensure that the plurality of clamping arms 10 can be in contact with or disengaged from the substrate 02 at the same time to avoid the displacement of the substrate 02 due to different contacting points of time. The more stable clamping of the substrate 02 can be provided.

Furthermore, the plurality of the clamping arms 10 are symmetrically arranged in pair at two sides of the substrate 02. Symmetrical clamping points can be provided for clamping the substrate 02. It can be understood that the two symmetrically arranged clamping arms 10 have the same direction of rotation as lifting or declining so that the frictional forces of the substrate 02 in the horizontal direction can be canceled by each other and both of these settings facilitate the position maintenance of the substrate 02.

In one embodiment, the accommodating space enclosed by the clamping arms 10 is a rectangle for corresponding to the substrate 02 which is also rectangular. At least one pair of the clamping arms 10 is disposed on both the long side and the short side of the substrate 02 so that the distribution of the clamping points of the substrate 02 is sufficiently wide, which can provide a more stable clamping effect on the substrate 02.

As regarding the clamping jaw 12, the dimension of the clamping jaw 12 has to be strictly controlled, particularly a distance from the highest position to the lowest position for the clamping jaw 12, i.e., the distance from the upper surface of the substrate 02. Thus, it can be ensured that the plurality of clamping jaws 12 can be in contact with or disengaged from the substrate 02 at the same time for ensuring that the force balance of the substrate 02 at the instant of contact so as to prevent the substrate 02 from shifting relative to the trolley 01.

Furthermore, a contact surface of the clamping jaw 12 with the substrate 02, i.e. the bottom surface 121 of the clamping jaw 12 needs to be processed to be an arc so as not to scratch the upper surface or coating of the substrate 02.

Above are embodiments of the present invention, which does not limit the scope of the present invention. Any modifications, equivalent replacements or improvements within the spirit and principles of the embodiment described above should be covered by the protected scope of the invention.

What is claimed is:

1. A substrate clamping device for fixing a substrate on a trolley of a sputtering machine, wherein
the substrate clamping device comprises clamping arms, a tray and a lifting driving device connected to a bottom of the tray, the lifting driving device drives the tray to move up and down relative to the trolley;
the clamping arms are provided on the trolley and are enclosed to form an accommodating space, the accommodating space is used to accommodate the substrate, the clamping arm comprises a bracket and a clamping jaw, the bracket is connected to the trolley by a rotary lifting mechanism to drive the clamping jaw to perform rotation and lifting movements simultaneously;

the clamping jaws are in contact with an upper surface of the substrate after rotation and declining movements to clamp to be placed on the substrate;

the tray is located below the trolley, the tray is provided with first pushing rods and second pushing rods;

the first pushing rods cooperate with the clamping arms to push the clamping arms upward;

the second pushing rods push the substrate upward.

2. The substrate clamping device according to claim 1, wherein the rotary lifting mechanism is a ball screw, the bracket is provided with a thread groove matched with the ball screw.

3. The substrate clamping device according to claim 2, wherein as the clamping arm is rotated by the first pushing rod, a maximum rotation angle of the clamping arm is 90 degrees.

4. The substrate clamping device according to claim 3, wherein a spring is disposed between the clamping arm and the trolley to provide a downward direction elastic force for the clamping arm.

5. The substrate clamping device according to claim 1, wherein there are a plurality of clamping arms, a number of the first pushing rods is equal to a number of the clamping arms and corresponds to each other one by one, the plurality of clamping arms are lifted or declined at the same time with a same speed.

6. The substrate clamping device according to claim 5, wherein the clamping arms are symmetrically arranged on both sides of the substrate.

7. The substrate clamping device according to claim 6, wherein two of the clamping arms, which are symmetrically arranged, have a same rotating direction as being lifted or declined.

8. The substrate clamping device according to claim 7, wherein the accommodating space enclosed by the clamping arms is a rectangle, at least one pair of the clamping arms is correspondingly arranged on a long side and a short side of the rectangle for clamping four edges of the substrate.

9. The substrate clamping device according to claim 1, wherein the plurality of the clamping jaws is in contact with or disengaged from the substrate at the same time.

10. The substrate clamping device according to claim 9, wherein a contact surface of the clamping jaw with the substrate is processed to be an arc so as not to scratch the substrate.

* * * * *